United States Patent [19]
Berrocal et al.

[11] Patent Number: 5,980,961
[45] Date of Patent: Nov. 9, 1999

[54] DEMINERALIZATION OF SWEET WHEY BY ELECTRODEIONIZATION

[75] Inventors: Rafael Berrocal, St-Legier; Michel Chaveron, La Tour-De-Peilz, both of Switzerland

[73] Assignee: Nestec S.A., Vevey, Switzerland

[21] Appl. No.: 08/947,046

[22] Filed: Oct. 8, 1997

[30] Foreign Application Priority Data

Oct. 9, 1996 [EP] European Pat. Off. ............. 96202810

[51] Int. Cl.⁶ .......................... A23C 21/00; A23L 1/307
[52] U.S. Cl. .................. 426/239; 426/271; 426/491; 426/583; 210/638; 204/630; 204/632; 204/633
[58] Field of Search .................................... 426/271, 583, 426/239, 491; 210/638; 204/630, 632, 633

[56] References Cited

U.S. PATENT DOCUMENTS

| | | | |
|---|---|---|---|
| 3,645,884 | 2/1972 | Gilliand | 204/301 |
| 4,138,501 | 2/1979 | Chaveron et al. | 426/239 |
| 4,497,836 | 2/1985 | Marquardt et al. | 426/239 |
| 4,632,745 | 12/1986 | Giuffrida et al. | 204/301 |
| 4,803,089 | 2/1989 | Chaveron et al. | 426/239 |
| 5,084,285 | 1/1992 | Shimatani et al. | 426/271 |
| 5,116,509 | 5/1992 | White | 210/644 |
| 5,120,416 | 6/1992 | Parsi et al. | 204/182.4 |
| 5,154,809 | 10/1992 | Oren et al. | 204/182.4 |
| 5,503,729 | 4/1996 | Batchelder et al. | 204/630 |

FOREIGN PATENT DOCUMENTS 1193630  11/1995  France .

OTHER PUBLICATIONS

Delaney, "Demineralization of Whey", *The Australian Journal of Dairy Technology* Mar. 1976, pp. 12–17.

Copy of Berrocal, et al., Application Serial No. 08/946,848 (Specification, Claims, Abstract and Drawing (effective Oct. 8, 1997).

*Primary Examiner*—Helen Pratt
*Attorney, Agent, or Firm*—Vogt & O'Donnell, LLP

[57] ABSTRACT

Sweet whey is demineralized by an electrodeionization process by passing sweet whey to be demineralized through a resin bed of strong cationic exchange resin contained in an electrodeionization dilution compartment or through a resin bed of weak anionic and of cationic, particularly strong cationic, exchange resins in the compartment, and in the process, the pH of the wash solution present in the electrodionization cation and anion concentration compartments is maintained so that the solution present in each concentration compartment has a pH value less than 5.

14 Claims, 1 Drawing Sheet

DEMINERALIZATION OF SWEET WHEY BY ELECTRODEIONIZATION

BACKGROUND OF THE INVENTION

The invention concerns the field of the demineralization of sweet whey with an electrodeionization process.

Demineralized whey, whether liquid or in powder form, constitutes the main component of products for infants and dietetic food products, in particular milks adapted to mother's milk. Demineralized whey also has other applications, for example as ingredients for the replacement of skimmed milk in confectionery-chocolate manufacture or in the manufacture of reconstituted milks.

The most effective known processes for demineralizing whey are electrodialysis and ion exchange, which are applied separately or in combination. In electrodialysis, ionized salts in solution in the whey migrate under the effect of an electric field through membranes which are selectively permeable to cations and to anions and are eliminated in the form of brine. In ion exchange, the ionic equilibrium is used between a resin as the solid phase and the whey to be demineralized as the liquid phase, the ions being adsorbed on the resin of the same nature during the saturation phase, and the resins are then regenerated.

For reasons of productivity, these two techniques are advantageously combined in a two-step process, electrodialysis ensuring an initial demineralization to approximately 50–60% and ion exchange, preferably multi-stage with successive weakly cationic and strongly cationic resins, achieving final demineralization to approximately 90–95%, as is described for example in U.S. Pat. No. 4,803,089.

These processes have the disadvantages that the ionic exchange stage requires large quantities of regenerating chemicals and consumes a large amount of water and that electrodialysis cannot be used beyond a degree of demineralization >60% due to its large electrical energy demand.

Electrodeionization, which is for example the subject of U.S. Pat. No. 4,632,745 or U.S. Pat. No. 5,120,416, carries out deionization continuously in the treatment of water by combining electro-dialysis and ion exchange in a single module, which has the advantage of low consumption of water and energy and eliminates the necessity of chemically regenerating the resins.

The electrodeionization technique consists of circulating the water to be demineralized through an assembly of cells in parallel delimited by cationic and anionic semi-permeable membranes and containing a mixture of resin beads, referred to as dilution compartments, these dilution compartments being separated from each other and their assembly being separated from the outside by spacers, forming compartments referred to as concentration compartments, delimited by anionic and cationic semi-permeable membranes, the complete assembly being placed between a cathodic compartment and an anodic compartment connected to an electrical supply. Wash water is circulated through the concentration spaces, which enables the ions which concentrate there on account of their polarity, to be eliminated in the form of effluent, by migrating through the membranes under the effect of the electric field from the dilution compartments to the concentration compartments.

Unlike the case of electrodialysis, resin beads loaded with adsorbed ions maintain a sufficient electric conductivity in the dilution compartments throughout the demineralization process. Moreover, it is not necessary to regenerate the resin beads, since the sites saturated with cations and anions are exchanged progressively with $H^+$ and $OH^-$ under the effect of the electric field.

In the process according to U.S. Pat. No. 4,632,745, resin beads are incorporated in a fixed manner in the dilution compartments whereas in the process according to U.S. Pat. No. 5,120,416, the beads are movable and it is possible to introduce them into the dilution compartments and to extract them from the compartments by circulation in the form of a suspension. In these known processes applied to water, the resins are present in a mixed bed of beads of a strongly cationic and strongly anionic type.

SUMMARY OF THE INVENTION

The present invention provides a process for the demineralization of sweet whey, characterized in that sweet whey is electrodeionized in an apparatus of which the dilution compartments or the concentration and dilution compartments contain a bed of resin beads consisting of a cationic resin alone or a bed of a mixture of a cationic resin and a weakly anionic resin and in that the pH of the concentration compartments is adjusted to a value of less than 5.

DETAILED DESCRIPTION OF THE INVENTION

Figure 1:
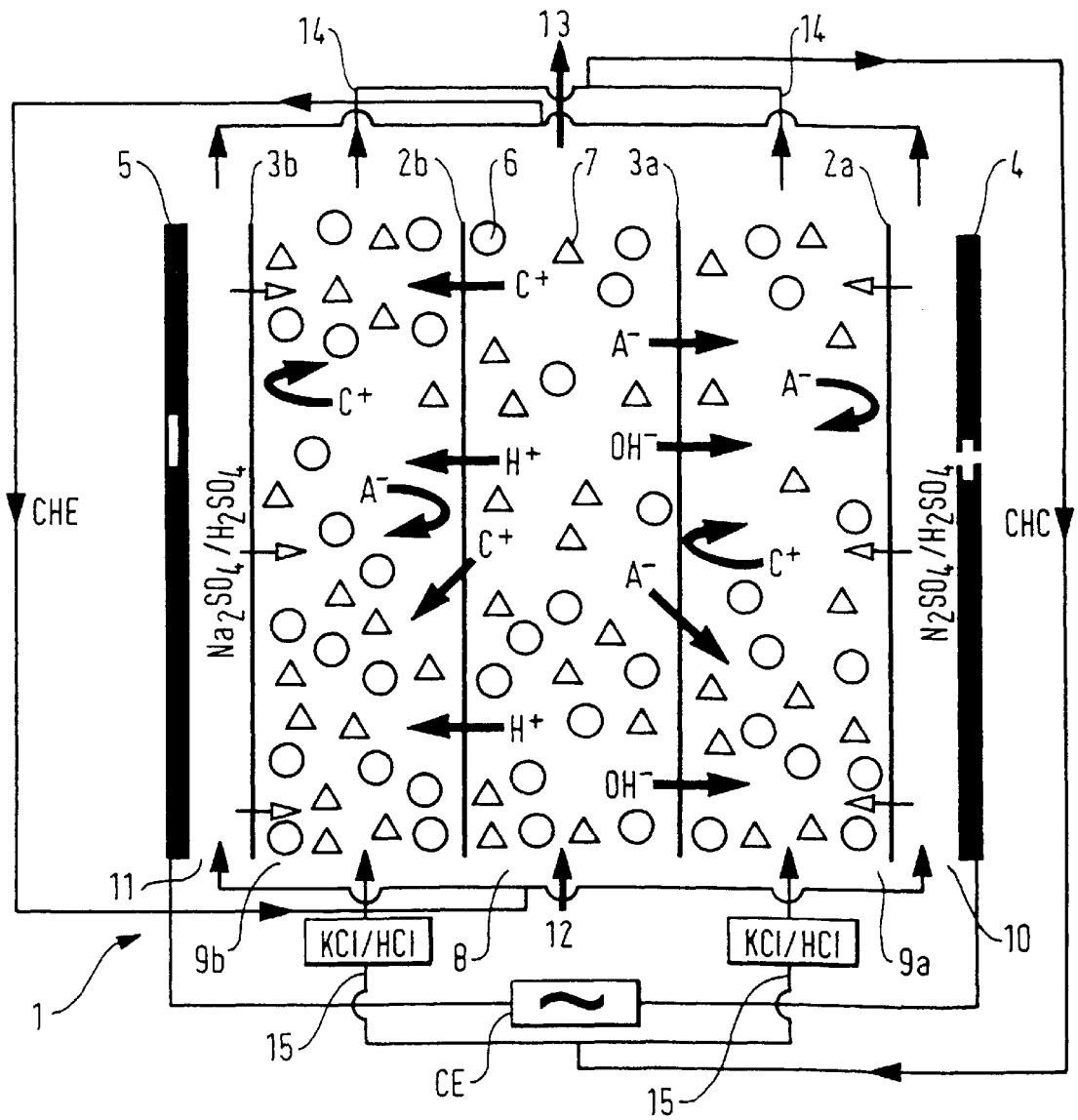

Within the context of the invention, a sweet whey is the liquid obtained after coagulation of casein by rennet in cheese making. The raw material may be raw, more or less concentrated or reconstituted in an aqueous medium from a powder.

Any material normally used in ion exchange may be used as the resin, for example macro-reticulated, in the form of a gel or in a macroporous form, as long as this material has the rigidity compatible with its confinement in cells and does not fix proteins by absorption or adsorption. A mixture of a cationic resin and a weakly anionic resin may be used. As a cationic resin, a weakly or strongly cationic resin may be used or a mixture of these resins. A weakly cationic resin has in general a high adsorptive capacity and relatively high swelling. A strongly cationic resin has a lower adsorptive capacity and limited swelling.

According to one embodiment of the process, electrodeionization is carried out with a bed of beads of a strongly cationic resin alone in the dilution compartments. With this embodiment, we have found that demineralization from the anions which it is desired to eliminate, essentially $Cl^-$ and citrates, as well as demineralization from cations, essentially $K^+$, $Na^+$, $Ca^{++}$ and $Mg^{++}$, is carried out in a satisfactory manner without the well known losses of proteins, with the advantage of a better microbiological quality at a temperature of around 30° C., due to the work leading to a low final pH, of the order of 3 to 4. In addition, the non-protein nitrogen was reduced, which increased the concentration of true proteins, sought in particular in products for infants and at the same time modified the aminogram of the product.

According to a variant, electrodeionization is carried out with a bed of beads of a strongly cationic resin and a weakly anionic resin in a mixed or layered bed in the dilution compartments, or in the dilution and concentration compartments at the same time, preferably in weight proportions of strongly cationic resin/weakly anionic resin of 30–40%/70–60%. The strongly cationic resin is preferably in the $H^+$ form and the weakly anionic resin in the $OH^-$ form.

We found that, when the concentration compartments were filled with a mixed bed or when these compartments were empty, the pH increased during demineralization. This fact, combined with the increase in the concentration of calcium and phosphorus coming from the dilution compartments, brought about a regular fall with time in the flow and an increase in pressure in these compartments, probably due to precipitation of calcium phosphates. It is essential that this phenomenon is overcome by preventing the pH exceeding 5 in these compartments. To this end, an acid aqueous solution is added, for example HCl, preferably by means of a pH-stat.

This measure is not necessary when the concentration compartments are filled with the cationic resin alone, which then has the function of reducing the pH by continually liberating H+ ions.

In carrying out the process of the present invention, it was also observed that the conductivity fell in the electrode compartments during demineralization. When the conductivity became too low in these compartments, demineralization slowed down or even stopped. To prevent this, acid was continually added, for example an aqueous sulphuric acid solution, so as to maintain the conductivity at a value compatible with efficient demineralization a value which is at least 5 mS and, for example at a value >5–20 mS.

When intensive de-anionization is required, it is preferable to increase the pH of the substrate to a value of approximately 7.5–8, either at the start of the demineralization process, or when the degree of demineralization has reached approximately 70% by making the substrate alkaline, for example by means of a strong base such as KOH. As an alternative, Ca hydroxide may be added and optionally, heating is carried out, for example at approximately 45° C./20 min., and the precipitate formed is then removed. Another alternative of this de-anionization consists of passing the substrate, for example demineralized to approximately 80%, through a column of weakly anionic resin.

The process according to the invention may be carried out continuously, in which case the substrate may on the one hand be directed to the dilution compartment of the module and then evacuated from this compartment progressively in the form of the demineralized product and on the other hand the washing flow may be directed towards the concentration compartment, and according to the versions used, the brine or dilute hydrochloric acid discharged from it progressively.

In an alternative embodiment, in a discontinuous manner or in batches, the substrate may be recirculated in a loop through the dilution compartment and the brine may be recirculated in a loop through the concentration compartment, until the desired degree of demineralization is attained.

After demineralization, the reactant obtained may be possibly neutralized by the addition of an alkali, preferably of food quality, and then dried, for example by spraying in a drying tower.

The product obtained by putting the process according to the invention into practice, whether it be a liquid or a powder, may serve as an ingredient in the manufacture of a foodstuff intended for human or animal consumption.

The product may in particular, be used for manufacturing lactoproteins, namely a partly delactosed product, such as one containing in particular around 30 to 40% by weight of proteins and around 45 to 55% by weight of lactose, or a demineralized whey product, such as one containing in particular around 9 to 15% of proteins and around 75 to 85% by weight of lactose.

The product may be used as a replacement for milk or whey as an ingredient in the manufacture of confectionery/ chocolate products or in the manufacture of frozen confectionery and in particular as a replacement for whey in the manufacture of products for infants, in particular milks adapted to mother's milk.

The process according to the invention is described in greater detail with reference to the accompanying drawing.

BRIEF DESCRIPTION OF THE DRAWING FIGURE

The sole accompanying drawing Figure diagrammatically illustrates apparatus for practice of the electrodeionization process of the present invention.

DETAILED DESCRIPTION OF THE DRAWING FIGURE

The accompanying drawing Figure presents a simplified description of apparatus for carrying out the electrodeionization process of the present invention in that it illustrates only a single sequence of alternate cells rather than a module which comprises several sequences of alternate cells arranged in parallel.

In the drawing Figure, module 1 comprises alternating semi-permeable polymeric membranes between the electrodes, an anode 4 and a cathode 5. Membranes 2a and 2b are permeable to cations and impermeable to anions, which are negatively charged, for example by sulphonic groups; and members 3a and 3b are permeable to anions and impermeable to cations, which are positively charged, for example bearing quaternary ammonium groups.

The membranes 2b and 3a delimit a cell filled with a bed of resin beads, for example strongly cationic beads 6 and weakly anionic resin beads 7, in mixed beds, constituting a dilution compartment 8 surrounded by two spacers delimited respectively by the membranes 2a, 3a and 2b, 3b, the space between being free from (empty) of resin beads or being filled with a bed of resin beads and forming the concentration compartments 9a, 9b. The anodic 10 and cathodic 11 compartments surround the concentration compartments 9a, 9b situated at the ends of the module.

In operation, the flow of substrate 12 to be demineralized passes through the dilution compartment 8 in which its cations such as $C^+$ are removed, adsorbed by the strongly cationic resin, and in which its anions such as $A^-$ are adsorbed by the weakly anionic resin.

Under the effect of the electric field CE created between the electrodes, the anions are directed towards the anode 4, passing through the membrane 3a and are repelled by membrane 2a. At the same time, the cations are directed towards the cathode 5, passing through the membrane 2b and are returned by the membrane 3b. The result is an impoverishment of the substrate 12 in ions, which is removed in the form of a flow of demineralized reactant 13, and in an enrichment in ions of the flow of wash solution 15 which enters the concentration compartments 9a, 9b and which is evacuated from these in the form of a flow of brine 14. These flows constitute the hydraulic circuit of the concentration compartments, CHC.

In a concomitant manner, cations pass from the anodic compartment 10 to the concentration compartment 9a through the membrane 2a and are repelled at the membrane 3a, whereas the $H^+$ ions migrate through all the module and regenerate the strongly cationic resin beads. At the same time, anions pass from the cathodic compartment 11 to the concentration compartment 9b through the membrane 3b and are repelled at the membrane 2b, whereas the $OH^-$ ions migrate throughout the module and regenerate the weakly anionic resin beads. In all, electrolysis of the water is produced providing regenerating ions. The flows circulating in the anodic and cathodic compartments and from one to the other constitute the hydraulic circuit of the electrode compartments CHE.

The following Examples illustrate the invention.

EXAMPLES

In the Examples:

percentages and parts are by weight, unless indicated to the contrary, prior to their treatment, the raw materials reconstituted from powder were centrifuged at 2000 g or filtered so as to remove solid particles likely to block the module, and the analytical values were obtained by the following methods:

true protein content: calculated from measurements by the Kjeldhal method of total nitrogen (TN) and non-protein nitrogen (NPN), i.e. as (TN−NPN×6.38, ash: determined by calcination at 550° C., cation contents ($Ca^{++}$, $Mg^{++}$, $Na^+$, $K^+$) and phosphorus content: measured by atomic absorption spectroscopy (AAS), citrate and lactate contents: determined by enzyme methods (Boehringer Mannheim, 1984), and $Cl^-$ contents: measured by potentiometric titration with $AgNO_3$, with a silver electrode.

EXAMPLES 1 AND 2

The modules, of which the dilution and concentration compartments were filled with the specified resin beads, were rinsed with copious amounts of distilled water and the different compartments were filled in the following manner:

the electrode compartments with 4 l of an aqueous solution containing 7 g/l of $Na_2SO_4$, the pH of which was adjusted to 2 with $H_2SO_4$.

the concentration compartments with 4 l of an aqueous solution containing 2.5 g/l of NaCl, and the dilution compartments with 2.5 or 8 kg of the substrate to be demineralized.

After 10 min recirculation to stabilize the pressure in the various compartments, 400 ml of the substrate were taken from the dilution compartment, weighed and retained for analysis. The voltage was set at the maximum value of 28 V, the current started to flow between the electrodes and demineralization commenced. The conductivity, temperature and pH in the various compartments were checked continuously and demineralization was carried out until there was a reduction in conductivity of 90–95% with respect to the conductivity of the starting substrate.

Demineralization occurred discontinuously, in batches, i.e. by circulating the substrate through the module until all the volume of the charge had reached the conductivity set as an objective.

In the examples including a charge treated of 8 kg, the conductivity of the concentration compartment (providing the collecting flow of ions) was maintained at a value of <30 mS (milliSiemens) by replacing half the solution with distilled water when this conductivity value was reached.

At the end of the demineralization process, that is to say when the degree of demineralization chosen in the first place was reached, which was not the maximum possible degree of demineralization, the current was switched off, the total volume of the demineralized reactant was collected, i.e. the permeate, and it was weighed and dried by freeze-drying. The procedure was the same with the brine from the concentration compartment or the residue and with the solutions from the electrode compartments.

Finally, the module was rinsed several times with distilled water or, if necessary, it was washed with a solution containing 2.5% NaCl/1% NaOH or with a solution of 5% NaCl/1% Na percarbonate, and it was rinsed with distilled water and was kept full of water between charges.

The operating conditions and the results obtained are shown in Table 1.

TABLE 1

| | Example | |
|---|---|---|
| | 1 | 2 |
| Resin type, mixture of strongly cationic %/weakly anionic % | HP111 ($H^+$ form)/ HP661 ($OH^-$ form) Rohm & Haas, 40/60 | HP111 ($H^+$ form)/ HP661 ($OH^-$ form), Rohm & Haas, 40/60, sweet whey, preconcentrated by evaporation |
| Sweet whey, dry matter (%) | 6.7 | 18.2 |
| Flow rate (l/min) | 0.7 | 0.7 |
| Length of treatment (min) | 35 | 94 |
| Final pH | 4.1 | 5.35 |
| Degree of demineralization | 91.76 | 87.13 |
| TN lost in % of original | 11.51 | 8.96 |
| True protein lost in % of original | 6.39 | 5.24 |

COMPARISONS

As a comparison, when the module without resin was used in the compartments, with a sweet whey having 6.7% dry matter and flow rates of 0.7 and 1.4 l/min respectively, much longer times were needed, 110 and 140 min respectively, to obtain the degrees of demineralization of 84.6% and 82.1% respectively.

In addition, when the module was used with standard strongly cationic/strongly anionic resins in a mixed bed with whey flow rates from 0.7 to 1.4 l/min, with dry matter contents of 6.7 to 19.8% for 28 to 70 min, demineralization rates of 85 to 91% were obtained, but with true protein losses of between 7.6 to 9.3%.

EXAMPLE 3

A sweet cheese whey was demineralized as in Examples 1 and 2, but one which had previously been concentrated by nanofiltration in a DDS module with plate and frame fitted with APV HC50 membranes, at a pressure of around 35 bar, until a degree of concentration of 19.8% was reached. The operating conditions and the results obtained are shown in table 2 below.

TABLE 2

| Type of resin, mixture of strongly cationic %/weakly anionic % | HP111 ($H^+$ form)/ HP661 ($OH^-$ form), Rohm & Haas, 40/60, Sweet whey, preconcentrated by nanofiltration |
|---|---|
| Sweet whey, dry matter (%) | 19.8 |
| Flow rate (l/min) | 1.4 |
| Treatment time (min) | 120 |

TABLE 2-continued

| Type of resin, mixture of strongly cationic %/weakly anionic % | HP111 (H+ form)/ HP661 (OH− form), Rohm & Haas, 40/60, Sweet whey, preconcentrated by nanofiltration |
|---|---|
| Final pH | 4.98 |
| Degree of demineralization (%) | 91.79 |
| TN lost in % of original | 9.85 |
| True protein lost in % of original | 5.21 |

EXAMPLES 4–5

The procedure was as in Examples 1 to 3, but the dilution compartment was only filled with a single type of resin, strongly cationic HP111 in the H+ form from Rohm & Haas. In addition, the various compartments were filled in the following manner:

the electrode compartments with 4 l of a 0.025 M aqueous solution of $H_2SO_4$, the concentration compartments with 4 l of a 0.015 M aqueous solution of HCl, and the dilution compartments with 5 or 8 kg of the substrate to be demineralized.

The treatment conditions and the results obtained are shown in Table 3.

TABLE 3

| | Example | |
|---|---|---|
| | 4 | 5 |
| Sweet whey, dry matter (%) | 6.7 | 6.7 |
| Length of treatment (min) | 28 | 25 |
| Flow rate (l/min) | 0.7 | 1.4 |
| Final pH | 3.06 | 3.69 |
| Degree of demineralization (%) | 95.02 | 83.88 |
| TN lost in % of the original | 8.45 | 2.14 |
| True protein lost in % of original | 1.27 | −2.27 |

Legend: the minus value means that part of the non-protein nitrogen disappeared from the substrate during treatment, which explains a negative loss and hence a gain of true protein.

COMPARISONS

As a comparison, when the module was used without resin in the dilution compartments, with a sweet whey having 6.7% dry matter and flow rates of 0.7 and 1.4 l/min respectively, much longer times were needed, 110 and 140 min respectively, to obtain the degrees of demineralization of 84.6% and 82.1% respectively.

In addition, when the module was used with standard strongly cationic/strongly anionic resins in a mixed bed with whey flow rates from 0.7 to 1.4 l/min, with dry matter contents of 6.7 to 19.8% for 28 to 70 min, demineralization rates of 85 to 91% were obtained, but with true protein losses of between 7.6 to 9.3%.

EXAMPLE 6

As in Example 2, demineralization was carried out on a preconcentrated sweet whey, but with the dilution compartment filled with a 40/60% mixture of a strongly cationic resin HP 111 (H+ form)/weakly anionic resin HP661 (OH− form), from Rohm & Haas, and with the concentration compartment left empty.

At the end of approximately 30–40 min., the pH in the concentration compartment had increased to a value approaching 5, and a regular reduction in the flow rate was noted together with an increase in pressure in this compartment. The pH was then maintained below 5 with automatic compensation by adding a 30% aqueous solution of HCl, for example by means of a pH-stat.

A reduction in the conductivity was also noted in the electrode compartments, which was maintained at 5–20 mS by continually adding an aqueous solution of sulphuric acid.

EXAMPLE 7

As in Example 2, demineralization was carried out on a preconcentrated sweet whey, but with the dilution compartment filled with a 40/60% mixture of a strongly cationic resin HP 111 (H+ form)/weakly anionic resin HP661 (OH− form), from Rohm & Haas, and with the concentration compartment filled with the strongly cationic resin HP111 (H+ form). Under these conditions, it was the strong resin which maintained the pH in the acid region.

In addition, the conductivity in the electrode compartments was maintained at 5–20 mS by continually adding an aqueous solution of sulphuric acid.

EXAMPLE 8

The procedure was as in Example 6, apart from the fact that once a demineralization level of 75% was reached, the pH of the substrate entering the apparatus was adjusted to 7.5–8 by the addition of an aqueous solution of KOH, and the pH was maintained at this value until a demineralization level of 90% was reached. A substantial reduction was thus obtained in the quantity of anions present in the final liquid whey, compared with that obtained without prior adjustment of the pH, as will be apparent from Table 4.

TABLE 4

| Anions at the start (g/kg) | Anions at the start (eq./kg) | Anions at the end without prior adjust-ment of the pH (g/kg) | Anions at the end without prior adjust-ment of the pH (eq/kg) | Anions at the end with prior adjust-ment of the pH to 7.5 (g/kg) | Anions at the end with prior adjust-ment of the pH to 7.5 (eq/kg) |
|---|---|---|---|---|---|
| 2.86 | 0.085 | 0.454 | 0.014 | 0.3 | 0.009 |

We claim:

1. In an electrodeionization process for demineralizing a substrate wherein a substrate comprising cations and anions is passed through an ion exchange resin bed contained in a dilution compartment between a cation-permeable membrane and an anion-permeable membrane, wherein an electric conductivity field produced from electrodes contained in electrode compartments directs cations from the dilution compartment via the cation-permeable membrane to a cation concentration compartment and directs anions from the dilution compartment via the anion-permeable membrane to an anion concentration compartment, wherein a wash solution is passed into and through the cation and anion concentration compartments for removing cations and anions from the concentration compartments and wherein a product from which cations and anions have been removed is collected from the dilution compartment, the improvements comprising:

passing a sweet whey through a dilution compartment resin bed which comprises a strong cationic exchange resin and maintaining a pH of the wash solution so that the solution present in the cation and anion concentration compartments has a pH value of less than 5.

2. A process according to claim 1 wherein the resin bed consists essentially of the strong cationic exchange resin.

3. In a electrodeionization process for demineralizing a substrate wherein a substrate comprising cations and anions is passed through an ion exchange resin bed contained in a dilution compartment between a cation-permeable membrane and an anion-permeable membrane, wherein an electric field produced from electrodes contained in electrode compartments directs cations from the dilution compartment via the cation-permeable membrane to a cation concentration compartment and directs anions from the dilution compartment via the anion-permeable membrane to an anion concentration compartment, wherein a wash solution is passed into and through the cation and anion concentration compartments for removing cations and anions from the concentration compartments and wherein a product from which cations and anions have been removed is collected from the dilution compartment, the improvements comprising:

passing a sweet whey through a dilution compartment resin bed which comprises a cationic exchange resin and a weak anionic exchange resin and maintaining a pH of the wash solution so that the solution present in the cation and anion concentration compartments has a pH value of less than 5.

4. A process according to claim 3 wherein the cationic and anionic exchange resins are beads and the cationic exchange resin is a strong cationic exchange resin.

5. A process according to claim 4 further comprising passing the wash solution through a resin bed which is present in each concentration compartment and which comprises strong cationic and weak anionic exchange resins.

6. A process according to claim 4 or 5 wherein, by weight proportion of strong cationic exchange resin to weak anionic exchange resin, the resins are in amounts of from 30%–40% cationic resin to 70% –60% anionic resin.

7. A process according to claim 4 or 5 wherein the strong cationic exchange resin is in an $H^+$ form and the weak anionic exchange resin is in an $OH^-$ form.

8. A process according to claim 1 or 3 or 4 further comprising passing the wash solution through a resin bed which is present in each concentration compartment and which comprises a strong cationic exchange resin to maintain the pH of the solution present in each compartment so that the solution present has a pH value less than 5.

9. A process according to claim 1 or 3 or 4 wherein the wash solution is acidic to maintain the pH value.

10. A process according to claim 9 wherein the wash solution comprises hydrochloric acid.

11. A process according to claim 3 or 5 wherein the resin beds are arranged in an arrangement selected from the group consisting of a mixed bed and a layered bed.

12. A process according to claim 1 or 3 wherein the electrical conductivity is maintained at at least 5 mS.

13. A process according to claim 1 or 3 further comprising treating the sweet whey passed to the resin bed so that the sweet whey passed to the resin bed has a pH of from 7.5 to 8.

14. A process according to claim 1 or 3 wherein the sweet whey is selected from the group consisting of a raw sweet whey and a sweet whey concentrate.

* * * * *

UNITED STATES PATENT AND TRADEMARK OFFICE
CERTIFICATE OF CORRECTION

PATENT NO. : 5,980,961
DATED : November 9, 1999
INVENTOR(S) : Rafael BERROCAL, *et al.*

It is certified that error appears in the above-identified patent and that said Letters Patent is hereby corrected as shown below:

Column 4, line 28, delete "members" and insert therefor -- membranes --.

Signed and Sealed this

Ninth Day of May, 2000

Attest:

Q. TODD DICKINSON

*Attesting Officer*   *Director of Patents and Trademarks*